United States Patent [19]

Konev

[11] Patent Number: 5,213,207
[45] Date of Patent: May 25, 1993

[54] CHAIN SAW FILE CASE

[76] Inventor: Nick Konev, Box 177, Plamondon, Alberta, Canada T0A-2T0

[21] Appl. No.: 770,443

[22] Filed: Oct. 3, 1991

[51] Int. Cl.$^5$ .................... B65D 85/20; B23D 71/10
[52] U.S. Cl. .................... 206/234; 206/349; 206/818; 29/80; 76/36
[58] Field of Search ............ 29/80; 206/237, 306, 206/349, 350, 373, 818; 76/36

[56] References Cited

U.S. PATENT DOCUMENTS

| 205,519 | 7/1878 | Ayers | 206/349 |
|---|---|---|---|
| 866,995 | 9/1907 | Wright | 206/234 |
| 1,517,540 | 12/1924 | Dempsey | 29/80 |
| 2,503,380 | 4/1950 | Derby | 206/234 |
| 2,570,412 | 10/1951 | Vogel | 206/234 |
| 2,573,325 | 10/1951 | Fowlie | 29/80 |
| 2,600,589 | 6/1952 | Swanson | 206/350 |
| 2,910,216 | 10/1959 | Bennett | 206/349 |
| 3,518,900 | 7/1970 | Ehlen et al. | 29/80 |
| 4,061,226 | 12/1977 | Essen | 206/306 |
| 4,572,366 | 2/1986 | Carson | 206/306 |

FOREIGN PATENT DOCUMENTS 614018 12/1960 Italy .................... 206/349

Primary Examiner—William E. Terrell
Attorney, Agent, or Firm—Leon Gilden

[57] ABSTRACT

A chain saw file case is arranged for the mounting and securement of a chain saw file to protect the relatively brittle file for maintaining its integrity and continued use. The case includes a cap threadedly securable within a base, with the cap and base coaxially aligned and the base including an alignment bushing formed with a conical interior surface at a lower terminal end thereof, with the base further including a tubular magnet mounted adjacent an upper terminal end thereof to accommodate and attract various metallic debris resulting from use of the file structure.

5 Claims, 4 Drawing Sheets

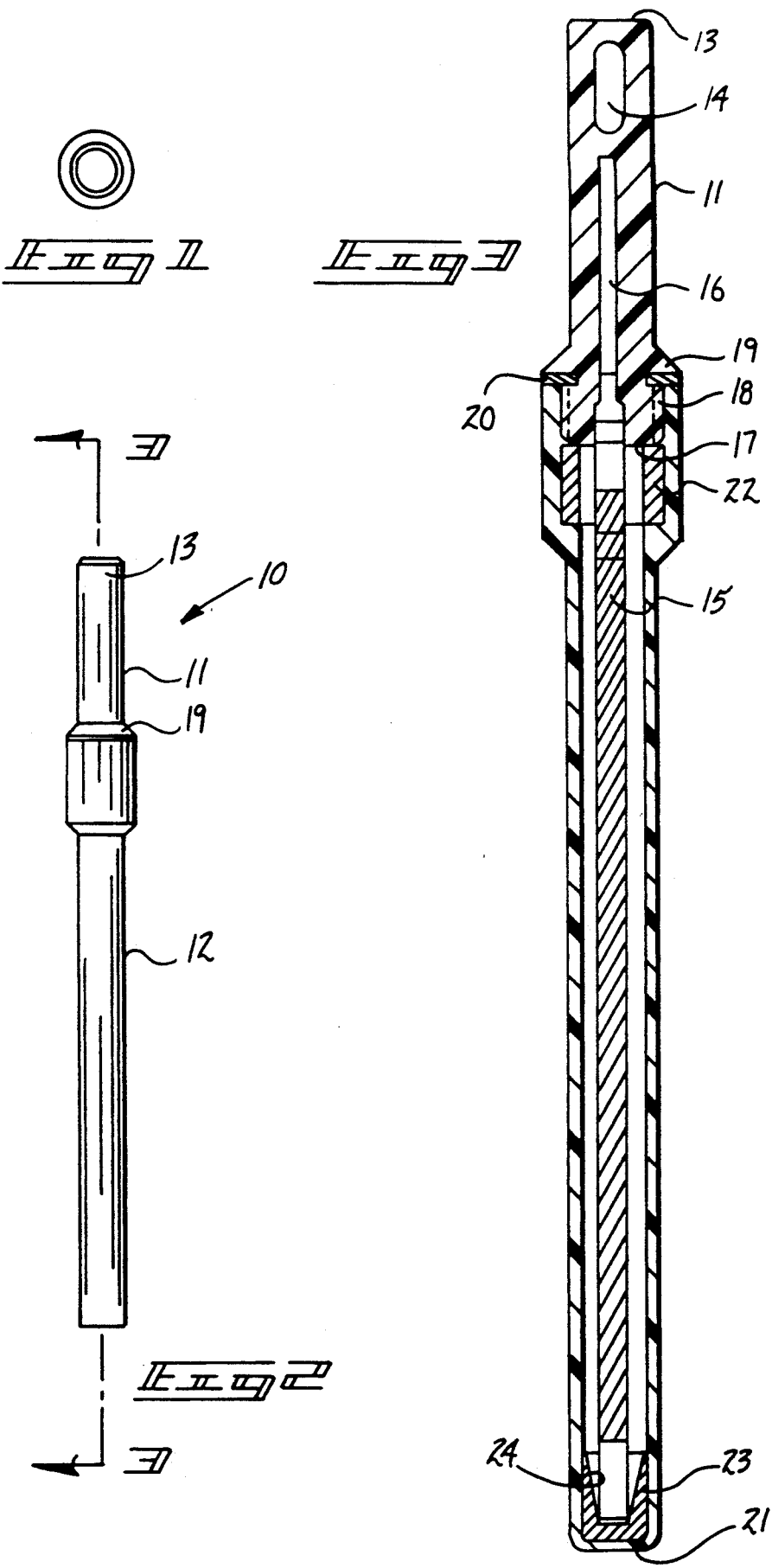

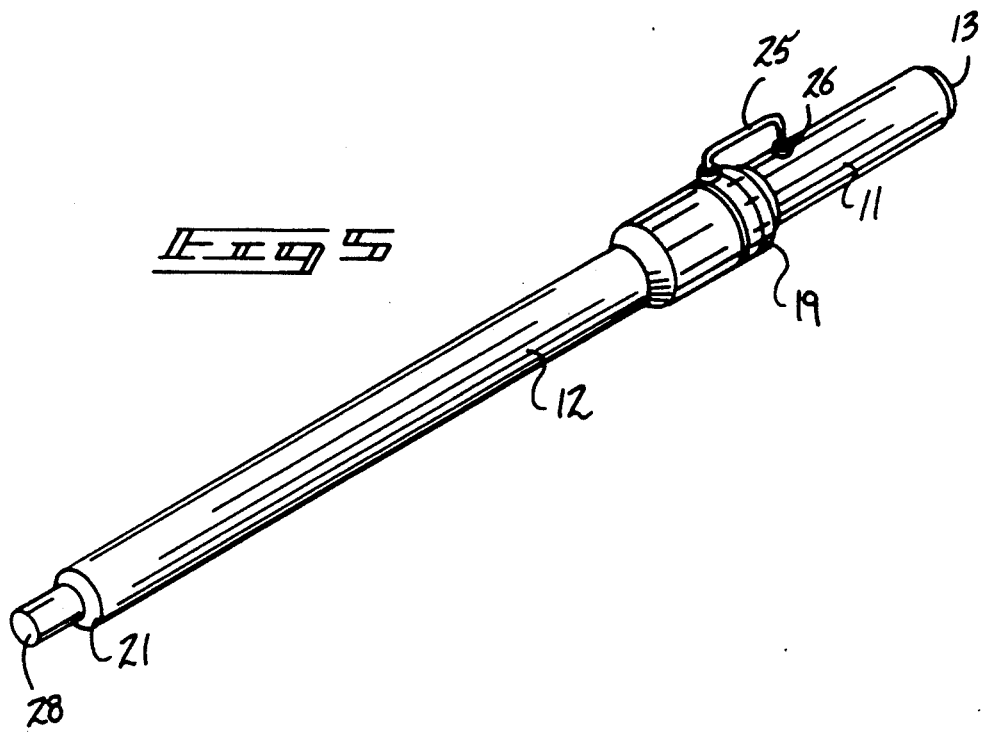
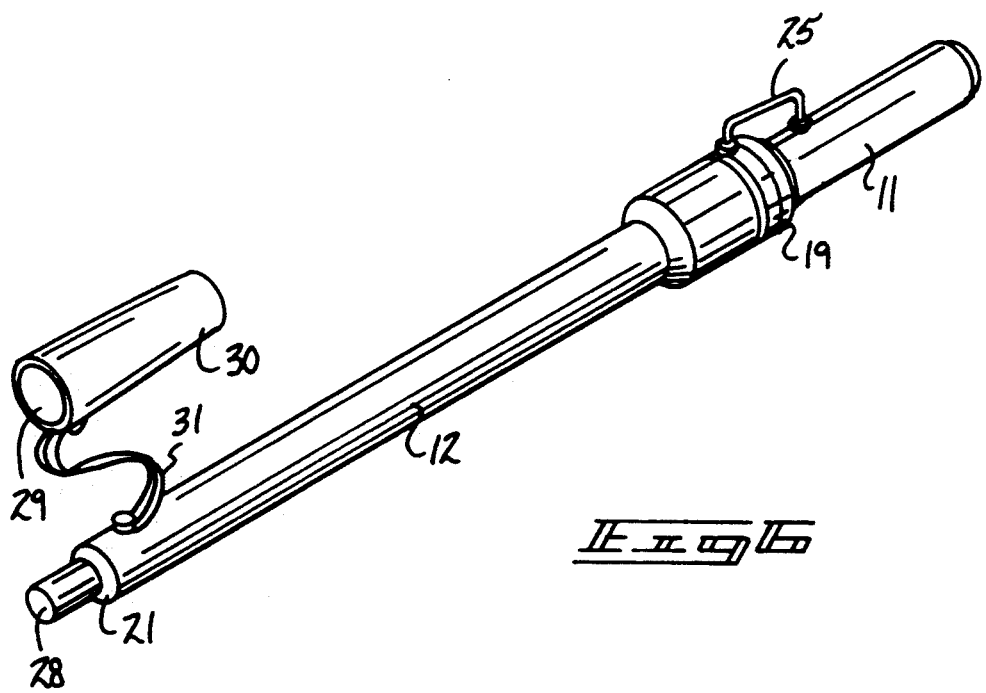

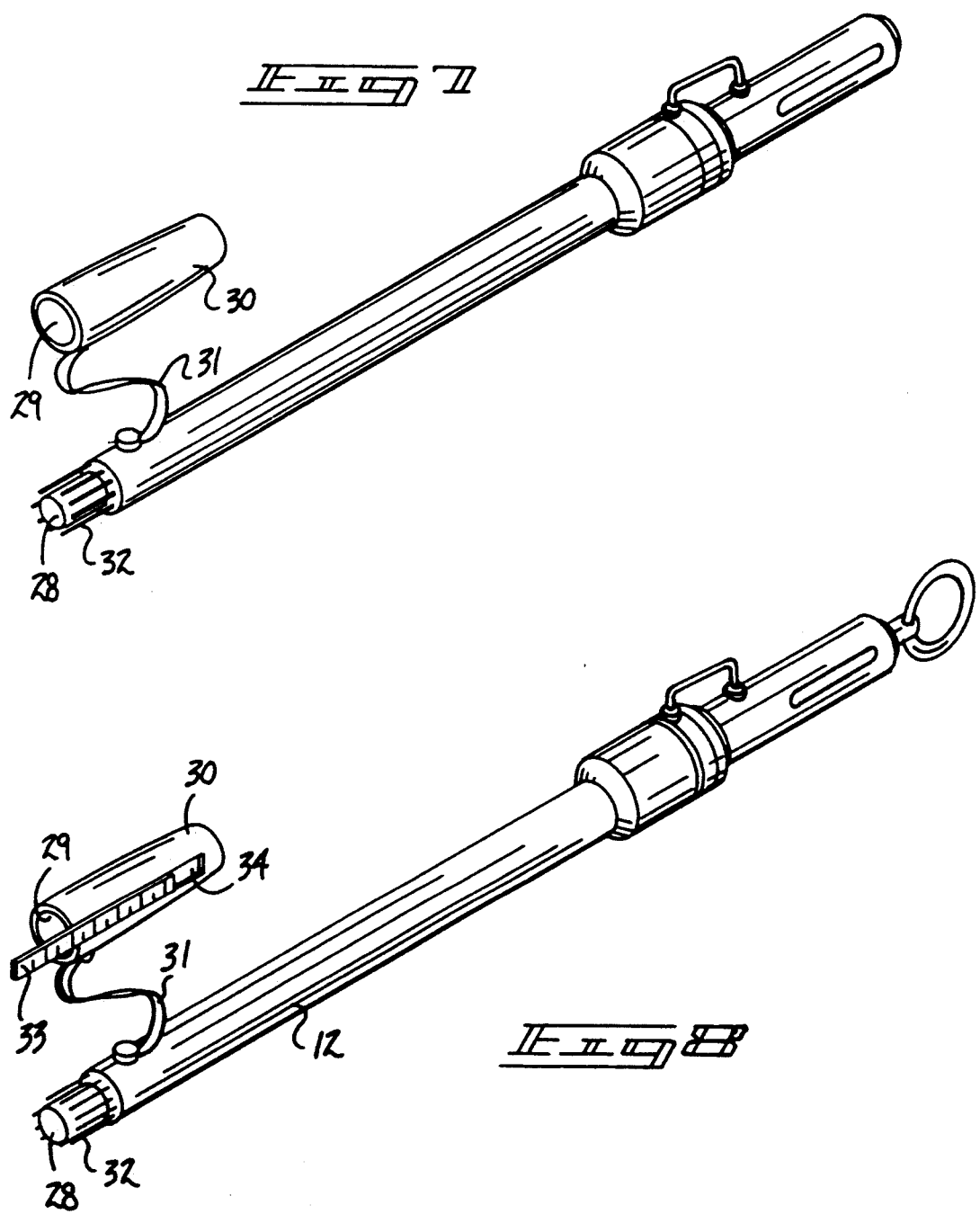

CHAIN SAW FILE CASE

BACKGROUND OF THE INVENTION

1. Field of the Invention

The field of invention relates to file apparatus, and more particularly pertains to a new and improved chain saw file case wherein the same is arranged to provide integrity and protection to an associated chain saw file to maintain its geometric integrity for continued and prolonged use thereof.

2. Description of the Prior Art

Chain saw files are of an extremely brittle and rigid nature due to their need to effect sharpening of hardened chain saw teeth. The nature of these files subjects them to ease of fracture during handling and use thereof. The instant invention attempts to provide for a secure carrying structure to accommodate the file during and subsequent to its use and to accommodate debris resulting from use of the file structure to provide for a self-cleaning organization in maintenance of the file structure.

Prior art file structure organizations are exemplified in U.S. Pat. No. 3,327,567 to Penberthy wherein a tubular file is mounted within a file guide structure for use in chain saw sharpening.

U.S. Pat. No. 3,867,853 to Lawless sets forth a chain saw file holder arranged for mounting the chain saw utilizing a support shank and spaced clamps to secure the file thereto.

U.S. Pat. No. 4,864,897 to Newman sets forth a chain saw sharpening tool mounting a file to an exterior surface of the tool structure.

U.S. Pat. No. 4,012,969 to Granberg and U.S. Pat. No. 3,518,900 to Ehlen, et al. are further examples of chain saw tools mounting a chain saw file to an exterior surface thereof.

In contrast, the instant invention sets forth an organization to provide for an enclosed housing to secure the chain saw file during periods of storage and transport and in this respect, the present invention substantially fulfills this need.

SUMMARY OF THE INVENTION

In view of the foregoing disadvantages inherent in the known types of chain saw apparatus now present in the prior art, the present invention provides a chain saw file case wherein the same is arranged for providing an enclosed, secure organization for a chain saw file. As such, the general purpose of the present invention, which will be described subsequently in greater detail, is to provide a new and improved chain saw file case which has all the advantages of the prior art chain saw apparatus and none of the disadvantages.

To attain this, the present invention provides a chain saw file case arranged for the mounting and securement of a chain saw file to protect the relatively brittle file for maintaining its integrity and continued use. The case includes a cap threadedly securable within a base, with the cap and base coaxially aligned and the base including an alignment bushing formed with a conical interior surface of a lower terminal end thereof, with the base further including a tubular magnet mounted adjacent an upper terminal end thereof to accommodate and attract various metallic debris resulting from use of the file structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved chain saw file case which has all the advantages of the prior art chain saw apparatus and none of the disadvantages.

It is another object of the present invention to provide a new and improved chain saw file case which may be easily and efficiently manufactured and marketed.

It is a further object of the present invention to provide a new and improved chain saw file case which is of a durable and reliable construction.

An even further object of the present invention is to provide a new and improved chain saw file case which is susceptible of a low cost of manufacture with regard to both materials and labor, and which accordingly is then susceptible of low prices of sale to the consuming public, thereby making such chain saw file cases economically available to the buying public.

Still yet another object of the present invention is to provide a new and improved chain saw file case which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the instant invention.

FIG. 2 is an orthographic side view of the instant invention.

FIG. 3 is an orthographic view, taken along the lines 3—3 of FIG. 2 in the direction indicated by the arrows.

FIG. 5 is a modified aspect of the invention mounting a magnet to a lower terminal end of the base portion.

FIG. 6 is a further modified aspect of the invention.

FIG. 7 is a yet further modified aspect of the invention illustrated in an isometric view.

FIG. 8 is an isometric illustration of a still further modified aspect of the invention.

DESCRIPTION OF THE PREFERRED EMBODIMENT

Figure 4:
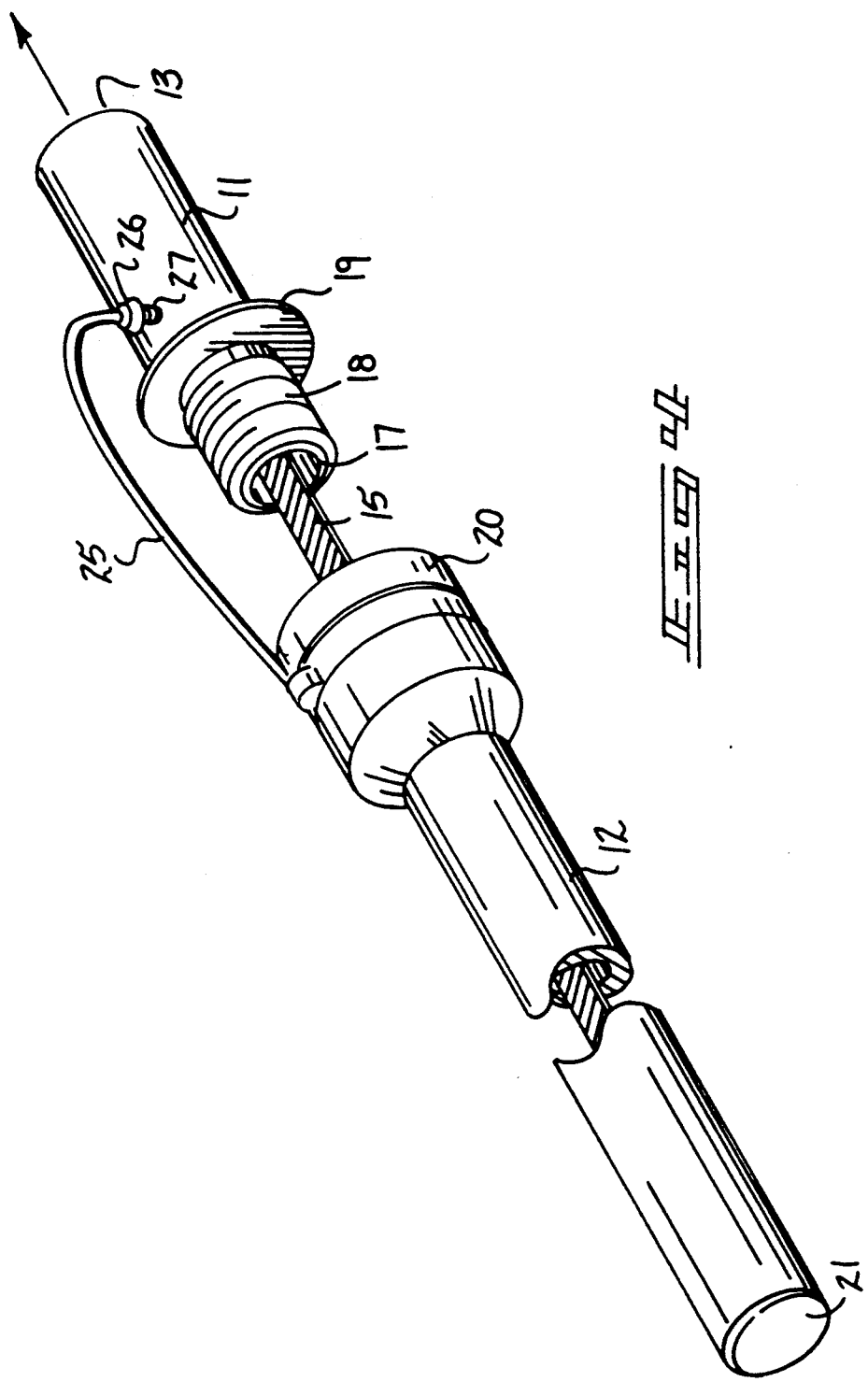
FIG. 4 is an isometric illustration of the invention.

With reference now to the drawings, and in particular to FIGS. 1 to 8 thereof, a new and improved chain saw file case embodying the principles and concepts of the present invention and generally designated by the reference numeral 10 will be described.

More specifically, the chain saw file case 10 of the instant invention essentially comprises a tubular cap 11 threadedly securable to an upper terminal end of a tubular base 12 to provide for a coaxially aligned relationship between the cap and the base. The cap includes a cap upper terminal end 13 and a cap lower torroidal end 17. A belt receiving loop 14 is diametrically directed through the cap adjacent the cap upper terminal end 13 to receive a belt for transport of the organization about an individual's belt in use. A file member 15 includes a file member shank 16 mounted within the cap 11 in a coaxially aligned relationship relative to the cap. The shank 16 may optionally be formed with a further gripping member that is received within a socket within the cap structure (not shown) as an alternative mounting of the shank within the cap. The shank as illustrated fixedly mounts a shank 16 within the cap structure to project the file member 15 below the cap in a coaxially aligned relationship. The cap includes an externally threaded lower surface 18 threadedly received within the tubular base 11 adjacent the tubular base upper terminal end 20. An abutment flange 19 projecting laterally of the cap limits projection of the externally threaded surface 18 within the base upper terminal end portion, as illustrated. A tubular magnet 22 is mounted within the tubular base adjacent the tubular base upper terminal end 20 arranged for abutment with the cap lower torroidal end 17 when the cap is mounted within the base, as illustrated in FIG. 3. The tubular magnet is arranged for attracting various metallic particles and debris as the file is directed into the tubular base to thereby provide for preliminary cleaning of the file 15 to maintain its preparedness for subsequence use relative to a chain saw structure. An alignment bushing 23 is mounted within the tubular base in contiguous communication with the lower terminal end 21 interiorly of the base, wherein the alignment bushing 23 includes a truncated conical interior bushing surface 24 to receive and align the lower terminal end of the file 15 and position the file within the case organization.

Reference to FIG. 4 illustrates the use of a support tether line 25 mounted to the base adjacent the base upper terminal end 20, including an internally threaded socket 26 threadedly securable to an externally threaded boss 27 mounted to the cap 11 to provide for selective securement of the cap relative to the base. The FIG. 5 illustrates the use of a cylindrical magnet 28 projecting coaxially and longitudinally of the cap lower terminal end 21 to provide for a magnet pick up of various debris relative to a chain saw structure in use of the file 15 in a sharpening and cleaning of an associated chain saw. Further, the FIG. 6 illustrates the use of a supplemental magnet 29 mounted to the base 12 by way of a tether line 31 secured to a magnet housing 30 that contains the supplemental magnet 29 therewithin. The use of a plurality of magnets accordingly will permit enhanced cleaning and wherein an opeartor may utilize both hands in a cleaning procedure, and wherein the tether line 31 is securable to the base 12 by a socket and boss interconnection, of a type as set forth by the socket and boss connection 26, 27 relative to FIG. 4 for example. FIG. 7 illustrates the cylindrical magnet 28, including a tubular brush bristle matrix 32 positioned adjacent to and to an exterior surface of the tubular magnet projecting forwardly of the tubular magnet to provide for a bristle brush matrix in surrounding relationship relative to the tubular magnet in a cleaning of a chain saw and for convenience, a gauge rule 33 is mounted to the magnet housing 30 to provide for gauging of a chain saw relative to its support bar (not shown) as a conventional means of servicing of a chain saw. It is further noted that a pivot 34 pivotally mounts the gauge rule to the supplemental magnet housing 30 to pivotally displace the gauge rule relative to the forward end of the housing 30 providing enhanced access to the supplemental magnet in use, and wherein the pivot permits positioning of the gauge rule, as illustrated, for access and alignment in spacing of a chain saw relative to a support bar.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A chain saw file case, comprising, a tubular cap, the tubular cap including a cap upper terminal end and a cap torroidal lower terminal end, the cap including a through-extending belt receiving slot directed through the cap adjacent the cap upper terminal end, and the cap including an externally threaded lower cap portion adjacent the cap lower terminal end, and an abutment flange diametrically aligned with the cap adjacent the externally threaded surface spaced from the cap lower terminal end, and a tubular base, the tubular base including a tubular base upper terminal end and a tubular base lower terminal end, the tubular base upper terminal end including an internally threaded surface to threadedly receive the externally threaded surface of the tubular cap, and the tubular base including an alignment bushing positioned within the tubular base at a lower terminal end thereof, wherein the alignment bushing includes a truncated conical interior bushing surface, and a file member, the file member including a file member shank coaxially aligned with and integrally mounted within the tubular cap projecting beyond the cap lower torroidal end and receivable within the alignment bushing when the tubular cap is mounted to the tubular base, and wherein the tubular base, the file member, and the tubular cap are in a coaxially aligned relationship in an assembled configuration.

2. An apparatus as set forth in claim 1 including a tubular magnet mounted within the tubular base adjacent the base upper terminal end in abutment with the cap lower torridal end, with the cap assembled to the tubular base.

3. An apparatus as set forth in claim 2 including a tether line, the tether line including a first end fixedly secured to the tubular base adjacent the tubular magnet upper terminal end, and the tether line second end including an internally threaded socket, and the cap including an externally threaded boss fixedly mounted to an exterior surface of the cap spaced above the abutment flange, wherein the externally threaded boss is arranged to threadedly receive the internally threaded socket.

4. An apparatus as set forth in claim 3 including a cylindrical magnet fixedly mounted to the base lower terminal end projecting longitudinally beyond the base lower terminal end, wherein the cylindrical magnet includes a tubular brush bristle matrix mounted to the base lower terminal end in surrounding relationship relative to the tubular magnet, wherein the bristle matrix extends longitudinally beyond the tubular magnet.

5. An apparatus as set forth in claim 4 including a supplemental magnet, the supplemental magnet including a supplemental magnet housing containing the supplemental magnet, and a supplemental magnet tether line mounted to the housing, where the supplemental magnet tether line is removably mounted relative to the tubular base for selective disengagement of the tubular base relative to the supplemental magnet housing, and a gauge rule fixedly mounted to the supplemental magnet housing, the gauge rule pivotally mounted to the supplemental magnet housing to permit pivotment of the gauge rule relative to the supplemental magnet housing to provide access to the supplemental magnet.

* * * * *